United States Patent [19]
Kadooka et al.

[11] Patent Number: 5,985,194
[45] Date of Patent: Nov. 16, 1999

[54] METHOD OF MAKING POLYMERIC SEMICONDUCTOR BODY

[75] Inventors: Humberto Takashi Kadooka; Ricardo Proveda Moreno; Olavo Nunes Da Costa, all of Sao Paulo, Brazil

[73] Assignee: Metagal Industria E Comercio LTDA, Sao Paulo, Brazil

[21] Appl. No.: 09/084,077

[22] Filed: May 22, 1998

Related U.S. Application Data

[63] Continuation-in-part of application No. 08/734,669, Oct. 18, 1996, abandoned, which is a continuation of application No. 08/285,987, Aug. 4, 1994, abandoned, which is a division of application No. 08/085,015, Jun. 29, 1993, Pat. No. 5,382,622.

[51] Int. Cl.[6] ............................. C04B 35/00; B29C 67/20
[52] U.S. Cl. ............................................. 264/105; 264/175
[58] Field of Search ...................................... 264/105, 175; 252/511

[56] References Cited

U.S. PATENT DOCUMENTS

| | | | |
|---|---|---|---|
| 4,055,526 | 10/1977 | Kiyokawa et al. | 264/22 |
| 4,465,617 | 8/1984 | Whipple et al. | 252/511 |
| 4,849,133 | 7/1989 | Yoshida et al. | 252/511 |
| 5,143,649 | 9/1992 | Blackledge | 252/511 |
| 5,277,729 | 1/1994 | Endo et al. | 156/157 |

*Primary Examiner*—Christopher A. Fiorilla
*Attorney, Agent, or Firm*—Michael J. Striker

[57] ABSTRACT

The method of making a semiconductor body from a semiconductor polymeric compound containing about 20% by weight lampblack having a porous structure, about 60% by weight of low density polyethylene, about 8.5% by weight ethylene vinyl acetate copolymer, about 4.0% by weight calcium stearate, about 3.0% by weight antioxidant and about 0.5% by weight calcium titanate includes the steps of extruding the semiconductor polymeric compound to form an extruded product and subsequently calendering the extruded product to produce a semiconductor body having an electrical conductivity which is as uniform as possible throughout the entire bulk of the semiconductor body.

2 Claims, 1 Drawing Sheet

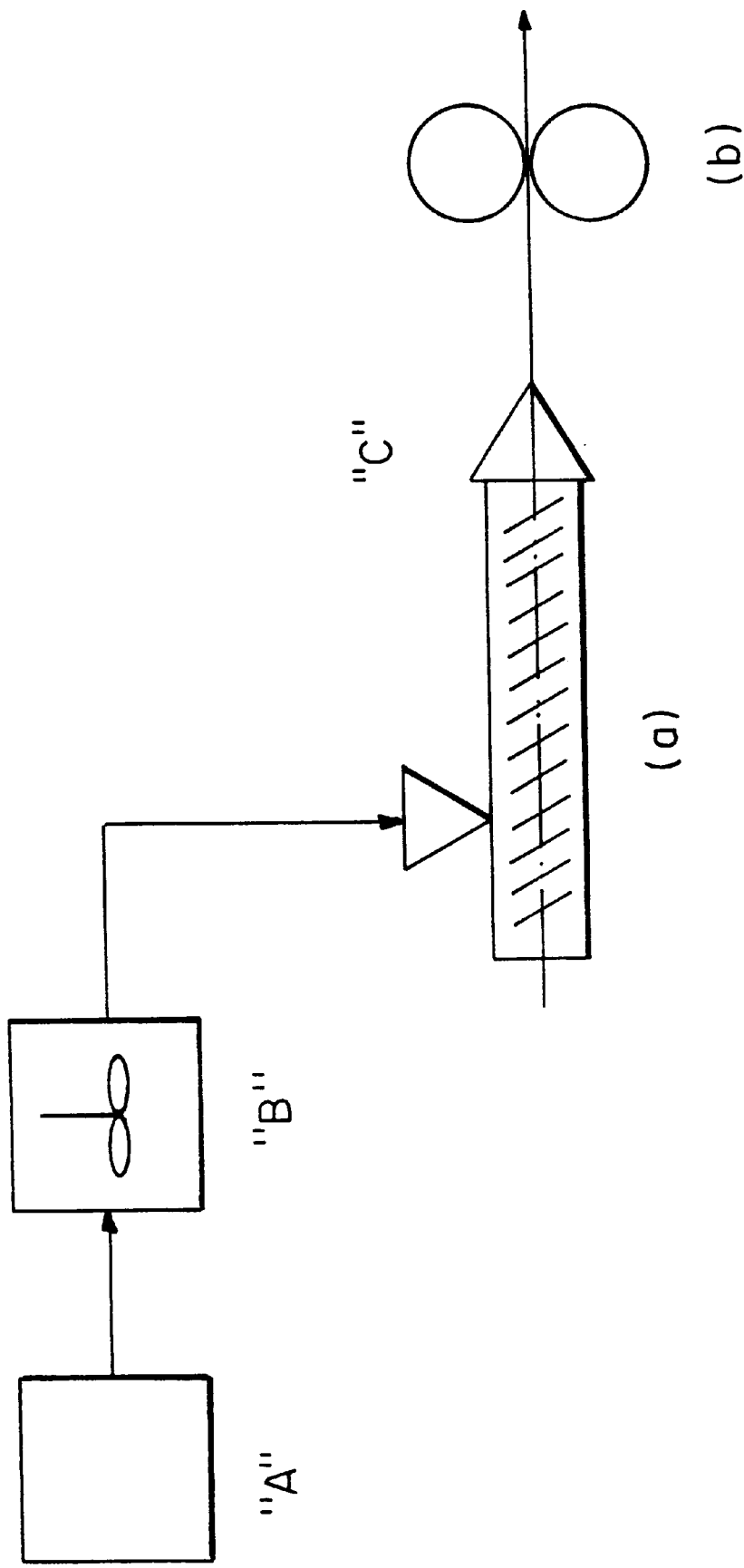

METHOD OF MAKING POLYMERIC SEMICONDUCTOR BODY

CROSS-REFERENCE

This is a continuation-in-part of U.S. patent application Ser. No. 08/734,669, filed Oct. 18, 1996, now abandoned, which, in turn, is a continuation of U.S. patent application Ser. No. 08/285,987, filed Aug. 4, 1994, now abandoned which, in turn, is a divisional of U.S. patent application Ser. No. 08/085,015, filed Jun. 29, 1993, now U.S. Pat. No. 5,382,622.

BACKGROUND OF THE INVENTION

The present invention relates to methods of obtaining a semiconductor body from a semiconductor polymeric compound and to the semiconductor body obtained from that method.

Polymeric semiconductor compounds are already known including, essentially, plastic materials which incorporate electrically conducting materials. These materials are widely used, but a major difficulty effecting their performance has been the electrical insulation of the particles of the conducting materials caused by the plastic material which results unless a high concentration of the conductive particles is used. High concentrations of these conducting particles are not ideal, since they can jeopardize the desirable mechanical properties of the polymer compound, making it hard and fragile.

Thus, the art of making a good polymeric semiconductor compound consists in using a minimum concentration of electrical conducting material to obtain the desired degree of electrical performance.

Lampblack, which may be obtained from combustion or cracking of hydrocarbons and consists essentially of carbon, is outstanding in conducting loads. Lampblack is classified as an inorganic material, in spite of the fact that it consists of carbon, is compatible with polymeric matrices and has a low cost.

In spite of the large acceptance of lampblack in polymeric semiconducting materials, it has many difficult "handling" problems in the process of making a semiconductor. These problems relate to the lampblack structure itself, its concentration and distribution in the polymer, its ingredients and methods of mixing of them. They also relate to the final molding of the semi-conducting part or body. They also impair the electrical characteristics of the product that is obtained.

In view of the foregoing problems and a strong interest in obtaining a highly efficient polymeric semiconductor compound for several devices, especially those used in the automobile industry, a series of studies on the structure and method of making this material and its relationship to the final conductivity of the material were developed. These studies are based on the existing technical literature and mainly on exhaustive laboratory experiments.

The theory of electrical conductivity of plastics loaded with lampblack particles shows that first of all the resistivity of the lampblack carbon particles should be considered.

For lampblack to be conductive the lampblack particles should have a comparatively small particle size, large structure, high porosity, and low content of volatile compounds, among other properties.

Another important fact effecting the conductivity of the lampblack is the chain structure and chain length. Recently, it was observed that, actually, the width or gaps between chains is of greater importance than the length and should be limited to allow electron tunneling, that is, to allow electrons to "jump" from one chain to another. When the gaps have widths which are larger than those suitable, the flow of electrons is interrupted and the material changes from a conductive to a nonconductive material.

Another significant parameter effecting the conductivity of lampblack in the polymeric semiconductor is the concentration, since the conductivity of the polymer semiconductor compound and lampblack do not increase linearly with the increase of lampblack concentration.

Indeed, studies show that, up to certain limits, a small increase in the concentration of lampblack in the semiconductor results in a considerable increase in conductivity. However above those limits, a great increase in the concentration does not provide a correspondingly great increase in conductivity, this phenomenon being known as percolation, with a large surface area or many pores of the lampblack particles corresponding to a low percolation number.

On the other hand, the functional relationship between resistivity and lampblack concentration has proved difficult to determine. The method of mixing in the manufacture of the compound is of great importance.

Several studies have been made in an effort to overcome the difficulties involved in understanding these materials. For instance, an early theory of Voet, Whitter and Cook, in 1965, proved that systems that show non-ohmic conduction in low conductivity composites can have electron tunneling occurring over gaps of up to 5 nm. The Brownian movement of the comparatively small lampblack particles is enough so that the particles approach close enough for the electron tunneling to occur.

A second theory of Scardisbrick of 1973, involves high conductivity ohmic conduction, and implicitly assumes that contacts between particles are ohmic, calculates probability of formation of random conductivity changes, considering the sphericity of the particles and other factors.

Besides the aspects mentioned above, which relate to the relationship of conductivity to the specific properties of the lampblack, other facts have an outstanding effect on the conductivity, for example, the processing method.

Thus, during the making of the semiconductor compound, it has been observed that the level of dispersion is critical. If the mixture is not uniform, there is a loss of the lampblack features which are important for conductivity such as chain structure, surface area and porosity and/or lack of dispersion. On the other hand, in the case of high shear during mixing, the mixture will be uniform. Both extremes, however are unfavorable for improvement of conductivity.

From that it can be concluded that the shearing and dispersion conditions in several molding methods, such as: extrusion, calendering, pressing, or others, are causes of different conductivities in mixtures of identical composition.

Furthermore, the method of processing a mixture of lampblack/polymer has a significant effect on the orientation of the particles and, consequently, on the conductivity properties of the finished product.

This relation is not only the result of reduction of lampblack structure with corresponding favorable distribution, but also of increase of orientation of lampblack aggregations during processing.

Thus, for the same composition, pressed blades show small specific resistance, while extruded sections, injected disks and tubular films show an increase of specific resistance. Articles molded by injection and consisting of thermoplastics and lampblack show a significant reduction in the specific resistance after a period of three months of storage, while semicrystalline thermoplastics retain the specific resistance at relatively high levels.

From that it can be concluded that the reduction in lampblack structure causes an increase of specific resistance when pressed and injected articles of the same composition are compared.

Besides, electron microscope studies show that the lower degree of conductivity in articles molded through injection, is due to a larger degree of orientation of lampblack aggregations. The volumetric resistivity in non-oriented formations is lower than in an oriented formation.

Experience shows that the conductivity of the extruded material is adversely influenced by thread speed, geometry and extruded matrix dimensions.

The geometry and dimensions of the matrix have great influence on the conductivity and the thread speed has a secondary influence.

Thus, based on the studies which were summarized above, development of a suitably improved polymeric semiconductor based on lampblack and method of obtaining it was undertaken to obtain electrical materials and/or devices having suitable electromechanical properties for a variety of applications.

SUMMARY OF THE INVENTION

It is an object of this invention to provide an improved semiconductor body made with an improved semiconductor polymeric compound.

It is also an object of the present invention to provided an improved method of making the semiconductor body.

According to the invention, the semiconductor polymeric compound consists essentially of about 60% by weight of low density polyethylene, of about 8.5% by weight ethylene vinyl acetate copolymer, of about 20% by weight of a conductive lampblack with a porous structure, of about 4.0% by weight of a spreading agent consisting of calcium stearate, of about 3.0% by weight of an antioxidant and about 0.5% by weight of a coupling agent consisting of calcium titanate.

The method of making the semiconductor polymeric compound according to the invention, comprises an "A" phase consisting of preparing a mixture of a polymeric matrix consisting essentially of about 60% by weight low density polyethylene and about 8.5% by weight ethylene vinyl acetate with about 20% by weight of a conductive lampblack with a porous structure, about 4.0% by weight of a spreading agent consisting of calcium stearate, about 3% by weight of an antioxidant, and about 0.5% of a coupling agent consisting of calcium titanate and a "B" phase including the steps of spreading the mixture in Banbury-type intermittent mixers under process conditions to obtain a high rate of lampblack shearing and homogenizing of sheared lampblack and spreading and coupling agents.

The method of making the semiconductor body includes the steps of extruding the semiconductor polymeric compound according to the invention to form an extruded product and subsequent calendering the extruded product. The thread speed and extruder matrix dimension and geometry and calender flap distance and opening and, if necessary, the amount of water and pressure level during the calendering are selected so as to make the electrical conductivity of the semiconductor body as nearly the same as possible at all points within the semiconductor body.

The parameter settings and dimensions for the extruder and calender that produce the most uniform conductivity throughout the semiconductor body are easily determined by testing a number of samples of the semiconductor body made with various different settings and dimensions, measuring the electrical conductivity at a number of locations throughout each of the semiconductor bodies and subsequently selecting the settings and dimensions which result in the most uniform conductivity throughout the semiconductor body.

BRIEF DESCRIPTION OF THE DRAWING

The objects, features and advantages of the present invention will now be illustrated in more detail by the following detailed description, reference being made to the accompanying drawing in which:

The sole FIGURE illustrates a method of obtaining the semiconductor polymeric compound based on lampblack according to the invention.

DESCRIPTION OF THE PREFERRED EMBODIMENTS

The method of obtaining the semiconductor polymeric compound based on lampblack includes a first step in which an "A" phase is formed by mixing a) polymeric matrix,
b) conductive lampblack,
c) a dispersing agent,
d) an antioxidizing agent, and
e) a coupling agent.

The polymeric matrix is formulated from polyethylene and ethylene vinyl acetate copolymer, the latter to help disperse the conductive material. So that the compound could have the desired electrical properties for the applications mentioned above, it was verified that the polymer matrix could have high lampblack loading capacity, without loosing its physical and mechanical properties, such as fragilization temperature, dimension stability at high temperature and others. These characteristics were attained by proper balancing of low density polyethylene properties and ethylene vinyl acetate copolymer, since the low density polyethylene provides good mechanical properties and the ethylene vinyl acetate copolymer provides excellent fragilization properties at low temperature, which is sensibly harmed by addition of loads.

The polymeric matrix is formulate with about 60% by weight low density polyethylene and about 8.5% by weight ethylene vinyl acetate copolymer.

The conductive lampblack used in the method has special properties, which differentiate it from those normally used in conventional semiconductors, and which, in principle, are based on its porous structure. Thus, the lampblack of the present invention has a porous structure to allow use of from one third to one fourth of the conventional amount used in semiconductors. The advantages in using lampblack having a porous structure in low concentration are several, including: reduced influence on the viscosity in melted polymers; weaker effect on the behavior of thermoplastic compounds during extrusion; absorption of the strongly reduced humidity on the conducting surface when the system operates under unfavorable climatic conditions; and reduced influence on mechanical properties of the finished products. The semiconductor polymeric compound includes 20 % lampblack with a porous structure.

Performed studies have shown that it is important that the conductive lampblack is sufficiently dispersed in the polymer so that the compound has the desired conductivity degree. For that reason, a spreading agent is included in the compound, which can be the internal lubricant, calcium stearate, which acts to eliminate friction and the delaying action of lampblack, while at the same time the conductivity is increased by desagglomeration and more uniform dispersion of the lampblack. The semiconductor polymeric compound of the invention should contain about 4% by weight of a spreading agent, preferably calcium stearate.

The compound is subjected to several processing steps which involve heat generation, and, for that reason, it was verified that it is essential that it have a suitable resistance to thermal oxidation degradation, that is, to irreversible changes in composition and structure of the polymer molecules. Important properties are adversely affected as a result of a complex sequence of chemical reactions in the presence of atmospheric oxygen.

It was shown that effective stabilizers against degradation manage to extend the useful life of polymeric articles in service, and that the stabilizers which are used as antioxidant agents have good compatibility, high resistance to extraction and low volatility. Because of that, the semiconductor polymeric compound according to the invention is provided with about 3% by weight of a stabilizer used as an antioxidizing agent.

The compatibilization of the conductive lampblack surface characteristics and the polymeric matrix may be obtained by surface treatment with a titanate coupling agent. The titinate coupling agent reacts with the free protons of the surface on the inorganic interface (conductive lampblack), resulting in the formation of organic mono-molecular layers, which are compatible/reactive with the matrix on the inorganic surface.

When conductive lampblacks treated with titanates are incorporated in polymeric systems, it has been observed that they frequently promote adhesion, improve the mechanical and electrical properties, produce loads above 50% if desired, prevent phase separation and have other advantages.

It was further shown that the benefits attributed to the titanate coupling agent, with regard to the electrical properties, are obtained by maximization of interparticle contacts, hydrophobicity and significant air and water reduction at the interfaces.

The semiconductor polymeric compound should contain about 0.5% by weight of a calcium titanate coupling agent.

It is further a part of the present improved method of making the semiconductor polymeric compound in a "B" phase which consists essentially in incorporating a conductive component in the polymeric matrix by the steps of:

a) supplying a mixture of the above components to a Banbury-type or Banbury® intermittent mixer under processing conditions selected to obtain high shearing rates, and simultaneously, b) mixing and homogenizing the sheared lampblack and polymer mixture so that in cooperation with the spreading and coupling agent, a uniform distribution of the conductive lampblack is provided and a conductive net is formed in the polymeric matrix.

The semiconductor polymeric compound based on lampblack consists essentially of:

a polymeric matrix composed of polymer compounds intended to provide good mechanical qualities, including about 60% by weight low density polyethylene and 8.5% by weight ethylene vinyl acetate based on a total amount of the semiconductor polymeric compound, about 20% by weight of a conductive lampblack with a porous structure (from about ⅓ to ¼ of the conventional amount used in conventional semiconductor polymeric compounds), about 4.0% by weight of a spreading agent consisting of an internal lubricant consisting of calcium stearate, about 3.0% by weight of a stabilizer used as antioxidant, and about 0.5% of a calcium titanate coupling agent.

In summary, the semiconductor polymeric compound based on lampblack consists essentially of about 60% by weight low density polyethylene, about 8.5% by weight ethylene vinyl acetate copolymer, about 20% conducting lampblack with a porous structure, about 4.0% by weight spreading agent consisting of calcium stearate, about 3.0% by weight antioxidant and about 0.5% by weight calcium titanate coupling agent.

The semiconductor polymeric compound based on lampblack described above and the method of making it were developed with the above-described features so that the influence of the compound conformation in the method of obtaining the semiconductor polymeric compound is minimized to obtain a maximum conductivity.

The method of obtaining the semiconductor body according to the invention includes first of all using the semiconductor polymeric compound described above and consisting essentially of about 60% by weight low density polyethylene, about 8.5% by weight ethylene vinyl acetate copolymer, about 20% conducting lampblack with a porous structure, about 4.0% by weight spreading agent consisting of calcium stearate, about 3.0% by weight antioxidant and about 0.5% by weight calcium titanate coupling agent.

The method of obtaining a semiconductor body from a semiconductor polymeric material based on lampblack also in phase "C" shown in the drawing includes the following additional steps: (a) extruding the semiconductor polymeric compound and (b) calendering the extruded product.

Furthermore the thread speed and the extruder matrix, geometry, dimensions and the distance and opening of the calender flap and amount of water and pressure level of the calender are selected to provide an electrical conductivity throughout the semiconductor body that is as uniform as possible.

The conductivities can be measured at the various locations in the semiconductor body by measuring the resistance at those locations by means of a conductivity meter such as an RMS multimeter.

In a preferred embodiment of the method the extruder and calender settings or parameters would also be controlled to provide the least possible degree of orientation of a lampblack aggregate in order to optimize conductivity in the semiconductor body. In principle this may be done by measuring the actual orientation of lampblack aggregates sampled from different locations in the semiconductor body by electron micrographs as described, e.g., in the article "Carbon Black" in the Encyclopedia of Polymer Science and Engineering, Vol. 2, John Wiley, Interscience, 1985, pp.623 to 639, or the similar article in the Kirk-Othmer, Encyclopedia of Chemical Technology, Vol 4, John Wiley & Sons, 1992, p. 1037 and following. However in practice measurement of the conductivity at various locations throughout the semiconductor body is easier and also includes the effects of other parameters on conductivity besides orientation of lampblack aggregates.

The improved semiconductor body based on lampblack, which was obtained by the above method and which is also the subject matter of the present disclosure, has a shape which is adapted to its use but consists essentially of the semiconductor polymeric compound of the above composition. This compound is extruded and calendered with a high degree of shearing and a low orientation of lampblack aggregates to produce a semiconductor body.

A semiconductor body based on the semiconductor polymeric compound according to the invention has the advantageous properties shown in the following Table I.

TABLE I

Semiconductor Body Properties

| Property | Value for the Semiconductor Body |
| --- | --- |
| Breaking tensile strength | 160 kgf/cm$^2$ |
| Elongation | 420% |
| Density | 1.07 g/cm$^3$ |
| Fluidity (230° C.-5 kg) | 0.11 g/10 min |
| Volumetric electric resistivity | 10$^3$ cm |
| Surface electric resistivity | 10$^3$ |

While the invention has been illustrated and described as embodied in a polymeric semiconductor body and methods of obtaining the polymeric semiconductor body from an improved semiconductor polymeric compound, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

We claim:

1. A method of making a semiconductor body from a semiconductor polymeric compound consisting essentially of about 20% by weight lampblack having a porous structure, of about 60% by weight of low density polyethylene, of about 8.5% by weight ethylene vinyl acetate copolymer, of about 4.0% by weight of a spreading agent consisting of calcium stearate, of about 3.0% by weight of an antioxidant and about 0.5% by weight of a coupling agent consisting of calcium titanate; said method comprising the steps of extruding said semiconductor polymeric compound to form an extruded product and subsequently calendering said extruded product to form said semiconductor body.

2. The method as defined in claim 1, wherein said extruding includes selecting an extruder thread speed, extruder matrix geometry and extruder matrix dimensions and said calendering includes selecting calender flap distance and opening.

* * * * *